United States Patent
Baek et al.

(10) Patent No.: US 8,990,879 B2
(45) Date of Patent: Mar. 24, 2015

(54) METHOD FOR PROVIDING DATA APPLICATION OF DIGITAL BROADCASTING

(75) Inventors: Wonjang Baek, Seongnam-si (KR); John Kim, Seoul (KR); Seong Baek Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 426 days.

(21) Appl. No.: 12/937,057

(22) PCT Filed: Apr. 10, 2009

(86) PCT No.: PCT/KR2009/001860
§ 371 (c)(1),
(2), (4) Date: Oct. 8, 2010

(87) PCT Pub. No.: WO2009/126001
PCT Pub. Date: Oct. 15, 2009

(65) Prior Publication Data
US 2011/0032420 A1    Feb. 10, 2011

(30) Foreign Application Priority Data
Apr. 10, 2008  (KR) ........................ 10-2008-0033193

(51) Int. Cl.
*H04N 7/173*    (2011.01)
*H04N 5/44*    (2011.01)
*H04N 21/235*    (2011.01)
*H04N 21/426*    (2011.01)
*H04N 21/435*    (2011.01)
*H04N 21/44*    (2011.01)
(Continued)

(52) U.S. Cl.
CPC ........... *H04N 5/4401* (2013.01); *H04N 21/235* (2013.01); *H04N 21/42684* (2013.01); *H04N 21/435* (2013.01); *H04N 21/44012* (2013.01); *H04N 21/472* (2013.01);
(Continued)

(58) Field of Classification Search
CPC ....................................................... H04N 7/173
USPC ......... 752/47; 375/240; 725/38, 47; 715/744, 715/716
See application file for complete search history.

(56) References Cited

U.S. PATENT DOCUMENTS 7,788,690 B2 *   8/2010   Ito et al. ........................... 725/47
2002/0057286 A1   5/2002   Markel et al. .................. 345/704
(Continued)

FOREIGN PATENT DOCUMENTS

JP    2000-197033 A    7/2000
JP    2005-151347 A    6/2005
(Continued)

OTHER PUBLICATIONS

Office Action issued in priority Korean Application No. 10-2008-0033193, four (4) pages.
(Continued)

*Primary Examiner* — Jefferey Harold
*Assistant Examiner* — Sihar Karwan
(74) *Attorney, Agent, or Firm* — Stein IP, LLC

(57) ABSTRACT

A method for providing a data application of a digital broadcasting is disclosed. In accordance with the present subject matter, a time necessary for receiving and executing the data application and a limit in a number of or a size of the data application are minimized and a personalized data application can be provided based on a receiver identification information or a viewer identification information.

11 Claims, 3 Drawing Sheets

(51) Int. Cl.
*H04N 21/472* (2011.01)
*H04N 21/488* (2011.01)
*H04N 21/6547* (2011.01)
*H04N 21/81* (2011.01)
*H04N 21/478* (2011.01)

(52) U.S. Cl.
CPC ........... *H04N 21/478* (2013.01); *H04N 21/488* (2013.01); *H04N 21/6547* (2013.01); *H04N 21/8193* (2013.01)
USPC .............. 725/131; 725/47; 725/38; 375/240; 715/744; 715/716

(56) References Cited

U.S. PATENT DOCUMENTS

| | | | | |
|---|---|---|---|---|
| 2004/0017513 | A1 | 1/2004 | Takahashi | 348/552 |
| 2004/0056891 | A1* | 3/2004 | Hiratsuka | 345/744 |
| 2004/0168185 | A1* | 8/2004 | Dawson et al. | 725/38 |

FOREIGN PATENT DOCUMENTS

| | | | |
|---|---|---|---|
| KR | 10-2004-0004633 | A | 1/2004 |
| KR | 10-2004-0067505 | A | 7/2004 |
| KR | 10-2006-0126291 | A | 12/2006 |
| KR | 10-2007-0023134 | A | 2/2007 |
| WO | WO 01/01686 | A1 | 1/2001 |

OTHER PUBLICATIONS

International Search Report dated Nov. 26, 2009, issued by WIPO in corresponding application PCT/KR2009/001860.
European Search Report dated Oct. 28, 2011, issued European Patent Office in corresponding application EP 09731435.5.
First Office Action dated May 3, 2012, issued by Chinese Patent Office in corresponding application CN 200980116822.3.
First Office Action dated May 8, 2013, issued by Japanese Patent Office in corresponding application JP 2011-503915.

* cited by examiner

METHOD FOR PROVIDING DATA APPLICATION OF DIGITAL BROADCASTING

CROSS-REFERENCE TO RELATED APPLICATIONS

This is a National Phase Application filed under 35 U.S.C. 371 as a national stage of PCT/KR2009/001860, filed on Apr. 10, 2009, an application claiming foreign priority benefits under 35 U.S.C. 119 of Korean Patent Application 10-2008-0033193, filed on Apr. 10, 2008, the content of each of which is hereby incorporated by reference in its entirety.

TECHNICAL FIELD

The present invention relates to a method for providing a data application of a digital broadcasting, and more particularly to a method for providing a data application of a digital broadcasting wherein a time necessary for receiving and executing the data application and a limit in a number of or a size of the data application are minimized and a personalized data application can be provided based on a receiver identification information or a viewer identification information.

BACKGROUND ART

A broadcasting environment is changing according to a development of technologies and a demand of viewers. As a broadcasting media becomes diverse, the broadcasting environment makes transition from a conventional analog broadcasting to a digital broadcasting, and from a terrestrial broadcasting to a cable broadcasting, a satellite broadcasting, an IP-TV (Internet Protocol TV) which is a service for providing a multimedia data using a high speed communication network, a T-DMB (Terrestrial Digital Multimedia Broadcasting) and a S-DMB (Satellite Digital Multimedia Broadcasting).

A capacity of the digital broadcasting is four to eight times that of the conventional analog broadcasting such that additional services in various fields such as sports, movies, home shoppings and musics may be provided. Moreover, thanks to the diverse broadcasting media, the viewer may choose from a large selection of the broadcasting media such as the cable broadcasting, the satellite broadcasting, the IP-TV and the DMBs as well as terrestrial broadcasting.

In addition, various digital broadcasting applications as well as a conventional broadcast program may be transmitted in the digital broadcasting. The digital broadcasting is capable of associating with a data included in the broadcast program or a data additionally transmitted though a return channel, thereby allowing the digital broadcasting application with interactive capabilities.

Various data services using the digital broadcasting application are expected to play an important role in spreading the digital broadcasting due to an easy use for the viewer.

A description of the method for providing a conventional data application is given below.

The data application generated by a data application providing server is transmitted to a head-end system carrying out the digital broadcasting. The head-end system transmits the broadcast program including an audio/video data and the data application to receiver via a digital broadcasting network.

Hereinafter, "digital broadcasting network" refers to various broadcasting networks such as a terrestrial broadcasting network, a cable broadcasting network, a satellite broadcasting network, a high speed communication network of an IP-TV (Internet Protocol TV) and a DMB (Digital Multimedia Broadcasting) network.

The data application received from the data application providing server is decoded and provided to a viewer by the receiver.

For instance, the receiver may be a digital TV or a set-top box in compliance with the terrestrial broadcasting specification such as the ATSC and interactive data broadcasting specification such as DASE in case of the terrestrial digital broadcasting. The receiver may be a set-top box supporting the broadcasting specification such as OpenCable and DVB and a data broadcasting specification suitable for the broadcasting network such as OCAP and MHP in case of the cable broadcasting or the satellite broadcasting. The receiver may be a set-top box or a mobile communication terminal supporting a corresponding data broadcasting specification in case of the IP-TV or the DMB.

However, the method for providing the conventional data application has following disadvantages.

First, the disadvantage is caused by a limited bandwidth of the digital broadcasting network.

Specifically, because the digital broadcasting network is used to transmit a broadcast program as well as the data application, the number, the size and the configuration of the data application that can be transmitted through the digital broadcasting network are limited.

For instance, a data size of a HD data application is larger than that of a SD data application. Therefore, the HD data application requires a higher bandwidth than the SD data application and the number of the HD data application that can be transmitted through the digital broadcasting network, and the number of the HD data application should be smaller than that of the SD data application. Moreover, the configuration and the number of the HD data application should be minimized so that the HD data application can be transmitted within the bandwidth of the digital broadcasting network.

Accordingly, a personalized data application cannot be provided due to the limit in the configuration and the number of the HD data application.

Second, the disadvantage is caused by the time necessary for executing the data application.

The head-end system divides into packets and transmits the data application to the receiver, and the receiver reconstructs the data application from the packets.

However, when some of the packets are lost during the transmission, the data application cannot be reconstructed and executed. When an error occurs during the transmission, the head-end system should re-transmit an entirety of the data application, and the receiver should reconstruct the data application from re-transmitted packets. Therefore, additional time is necessary. Moreover, the receiver loads and executes the entirety of the data application such that an execution speed is degraded and excessive resource of the receiver is used.

As a result, additional 10 to 30 seconds are necessary to execute and provide the data application to the user.

Third, the disadvantage lies in the receiver itself.

That is, because the receiver has limited resources, the data application having a large size cannot be executed. Therefore, the number and the configuration of the data application are limited to the resources of the receive.

DISCLOSURE

Technical Problem

It is an object of the present invention to provide a method for providing a data application of a digital broadcasting wherein a time necessary for receiving and executing the data application and a limit in a number of or a size of the data application capable of providing is minimized and a personalized data application can be provided based on a receiver identification information or a viewer identification information.

Technical Solution

In accordance with a first aspect of the present invention, there is provided a method for providing a data application of a digital broadcasting, the method being carried out in a receiver for receiving and providing the data application, the method comprising steps of: (a) receiving a scene configuration information for a scene of the data application; (b) receiving one or more components constituting the scene based on the scene configuration information; and (c) providing the data application based on the scene configuration information and the one or more components.

Preferably, the step (a) comprises receiving the scene configuration information through a digital broadcasting network.

Preferably, the step (a) comprises receiving the scene configuration information through a communication network.

Preferably, the scene configuration information defines a scene configuration based on the scene selected based on at least one of a user input, a receiver identification information and a viewer identification information.

Preferably, the scene configuration information comprises an execution code for interpreting the scene configuration information.

Preferably, the scene configuration information comprises an execution code for interpreting the scene configuration information.

Preferably, the scene configuration information comprises a text data for the scene.

Preferably, the scene configuration information comprises a download path information for each of the one or more components, and wherein the step (b) comprises: (b-1) transmitting a transmission request for the one or more components to an apparatus for providing the one or more components; and (b-2) receiving the one or more components from the apparatus according to the download path information.

Preferably, the transmission request comprises one of a receiver identification information and a viewer identification information.

Preferably, each of the one or more components comprises at least one of an independently executable code, a text data, an image data, an audio data and a video data.

Preferably, the step (c) comprises: (c-1) configuring a layout for the scene based on the scene configuration information; and (c-2) displaying the one or more components according to the layout.

Preferably, the step (c-2) comprises displaying the one or more components according to a received order thereof.

ADVANTAGEOUS EFFECTS

The method in accordance with the present invention is advantageous in that a time necessary for receiving and executing the data application is minimized. The method is also advantageous in that a number of or a size of the data application capable of providing is minimized. In addition, a personalized data application can be provided based on a receiver identification information or a viewer identification information.

BEST MODE

A preferred embodiment of a method for providing a data application of a digital broadcasting in accordance with the present invention will be described in detail described with reference to accompanied drawings.

Figure 1:
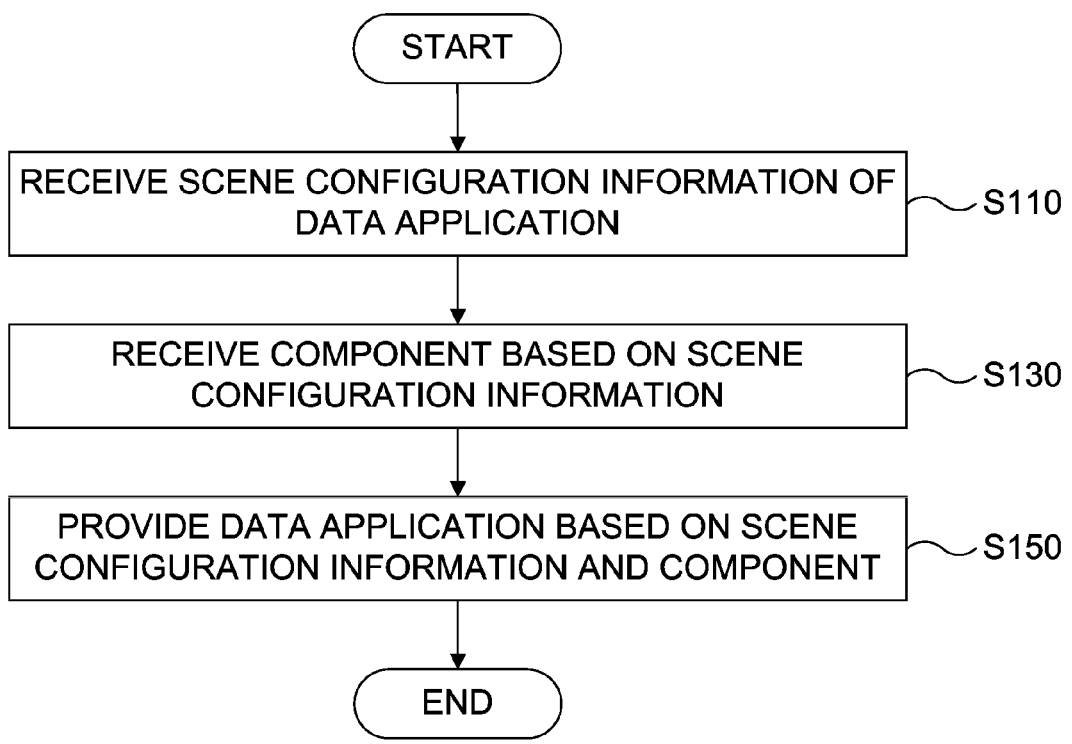
FIG. 1 is a flow diagram exemplifying a method for providing a data application of a digital broadcasting carried out in a receiver for providing the data application in accordance with the present invention.

FIG. 1 is a flow diagram exemplifying a method for providing a data application of a digital broadcasting carried out in a receiver for providing the data application in accordance with the present invention.

Referring to FIG. 1, a scene configuration information for a scene of the data application is received (S110).

In one embodiment, the scene configuration information may be received via a digital broadcasting network.

Conventionally, an entirety of the data application of the digital broadcasting is transmitted to the receiver. Contrarily, in accordance with the present invention, only the scene configuration information is transmitted to the receiver, and the receiver receives the scene configuration information via the digital broadcasting network.

In another embodiment, the scene configuration information may be received via a communication network.

Conventionally, an entirety of the data application of the digital broadcasting is transmitted to the receiver. Contrarily, in accordance with the present invention, only the scene configuration information is transmitted to the receiver via the communication network such as a return channel from a head-end system or a server of a provider of the data application, and the receiver receives the scene configuration information via the communication network.

A detailed description of the scene configuration information is given below.

Figure 2:
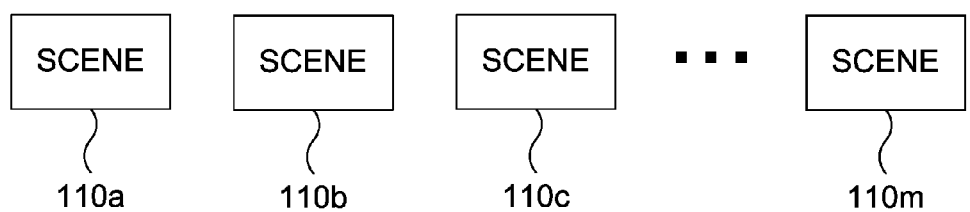
FIG. 2 is a diagram exemplifying scenes in accordance with the method of the present invention.

FIG. 2 is a diagram exemplifying scenes in accordance with the method of the present invention.

Referring to FIG. 2, the data application includes one or more scenes 110*a* through 110*m*.

When the data application is provided to a viewer by the receiver, the viewer may select one of the one or more scenes 110*a* through 110*m* through a user input, and the receiver provides the selected scene to the viewer.

For instance, the scene 110*a* may be an initial screen provided to the viewer when the receiver executes the data application. The scene 110*b* may be a screen provided to the viewer when a certain button of a remote control is pressed by the viewer.

When a personalized data application is to be provided, the scene 110*a* may be a screen provided to a first viewer group and the scene 110*b* may be a screen provided to the second viewer group.

When the personalized data application is provided, the receiver selects one of the one or more scenes 110*a* through 110*m* based on a receiver identification information or a viewer identification information, and the selected scene is provided to the viewer.

Each of the scenes 110*a* through 110*m* comprises one or more components (not shown).

For instance, when a stock exchange quotation is displayed on the scene 110*b*, the scene 110*b* may comprise a first component for providing Korean stock index in a form of text, a second component for providing a stock information of a certain company listed in Korean stock market, a third component for providing a video related to Korean stock market, and a fourth component for providing information on US stock market in a form of text or video.

That is, the scene configuration information may include a component information on the one or more component constituting each of the one or more scenes 110*a* through 110*m*.

The component information includes a name of the component and/or an identification information thereof. The component information may further include a download path information of the component necessary for receiving the component by the receiver.

The download path information points to an apparatus that provides the components and a path of the component stored in the apparatus.

The scene configuration information may include a layout information for the scene. The layout information defines how the components are arranged in the scene. For instance, when the first component and the second component constitutes the scene 110*a*, the scene configuration information for the scene 110*a* includes an identification information of the first component, a download path information of the first component, a layout information of the first component, an identification information of the second component, a download path information of the second component and a layout information of the second component.

The download path informations for the first component and the second component may differ from each other.

For instance, the first component may be received from the apparatus for providing the first component and the second component may be received from the apparatus for providing the second component.

In addition, the scene configuration information of a certain scene may be received or the scene configuration information of an entirety of the scenes may be received.

Referring to FIG. 2, the scene configuration information for the scene 110*a* is received first and the scene configuration information for the scene 110*b* is then received if necessary.

For instance, when the viewer requests the scene 110*a*, the receiver may receive the scene configuration information for the scene 110*a*, and when the viewer additionally requests the scene 110*m*, the receiver may then receive the scene configuration information for the scene 110*m*.

The scene configuration information may include an execution code for interpreting the scene configuration information.

In accordance with the present invention, the receiver extracts from the scene configuration information and interprets the component information and the layout information.

In order to interpret the component information and the layout information, i.e. the scene configuration information, an execution code is required.

The receiver utilizes the execution code to interpret the scene configuration information. The execution code may be stored in the receiver.

When the execution code is included in the scene configuration information instead of the receiver, the receiver may execute the execution code and interpret the scene configuration information.

The execution code may be executed independently from programs necessary for providing broadcasting programs and executing the data application.

In addition, the scene configuration information may include a text data for the scene.

The text data includes a text that is to be displayed in the scene such as a description of the scene.

Referring back FIG. 1, the one or more components constituting the scene is received based on the scene configuration information (S130).

Figure 3:
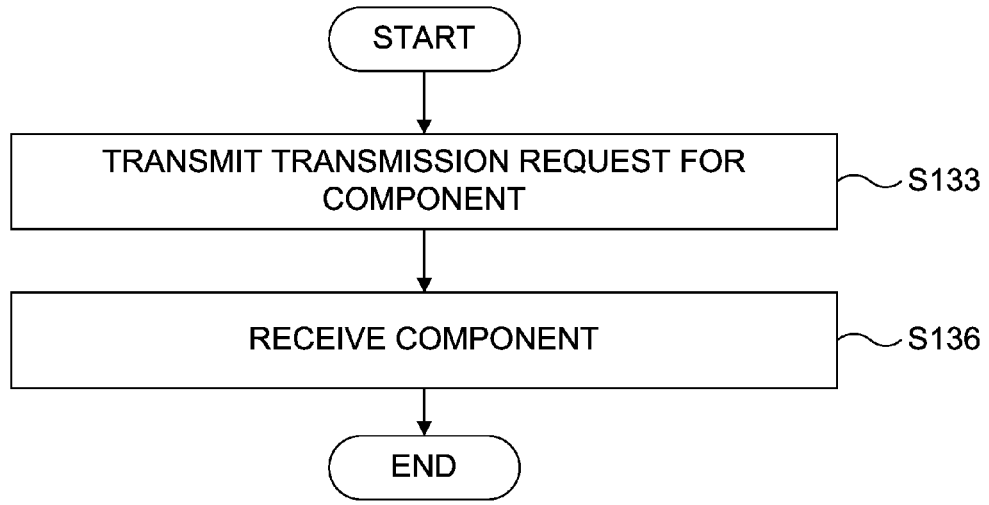
FIG. 3 is a flow diagram illustrating the step S130 for receiving the one or more components constituting the scene.

FIG. 3 is a flow diagram illustrating the step S130 for receiving the one or more components constituting the scene.

Referring to FIG. 3, the receiver transmits a transmission request for the one or more components to the apparatus that provides the one or more components by referring to the download path information (S133).

The transmission request may be transmitted via the communication network instead of the broadcasting network.

The transmission request may include the receiver identification information or the viewer identification information.

The receiver identification information or the viewer identification information may be used to provide the personalized data application.

The apparatus selects the component based on the receiver identification information or the viewer identification information and transmits the selected component to the receiver.

Thereafter, the one or more components are received from the apparatus by referring to the download path information (S136).

The download path informations for the one or more components may be same or differ from each other.

For instance, the first component and the second component may be received from two different apparatus for providing the component.

When a stock exchange quotation is displayed on the scene 110*b* of FIG. 2, the scene 110*b* may comprise a first component for providing Korean stock index in a form of text, a second component for providing a stock information of a certain company listed in Korean stock market, a third component for providing a video related to Korean stock market, and a fourth component for providing information on US stock market in a form of text or video.

Specifically, the first component may include the text data. The second component may include an execution code for receiving a user input for selecting a company, an execution code for displaying the stock information in graphs, and a graph image data. The third component may include a video data. The fourth component may include the text data or the video data. The execution code included in the second component may be executed independently in the scene rather than being executed for an entirety of the data application.

Referring back to FIG. 1, the data application is provided based on the scene configuration information and the one or more components (S150).

Figure 4:
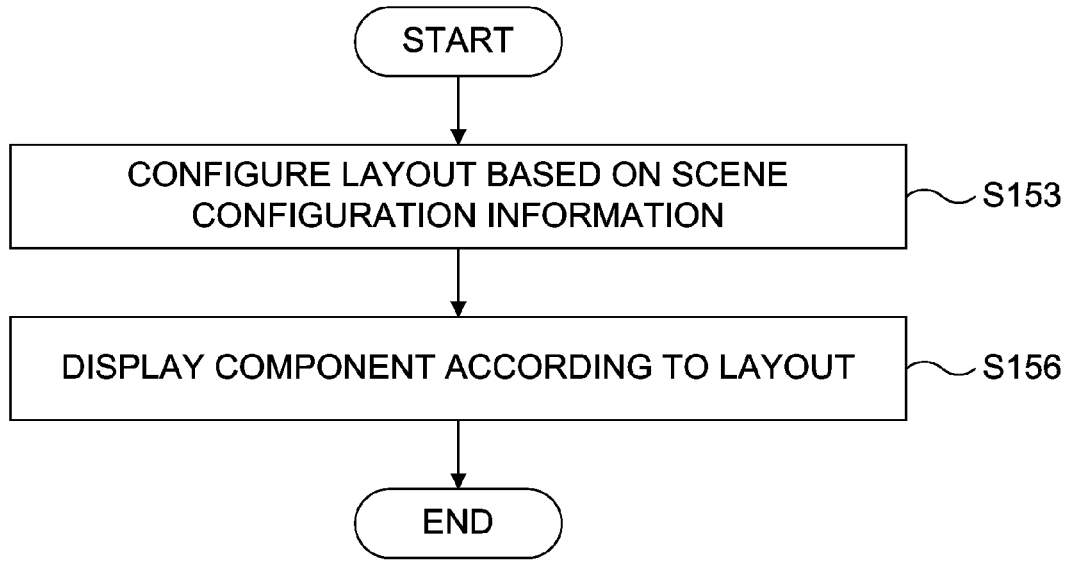
FIG. 4 is a flow diagram illustrating the step S150 for providing the data application.

FIG. 4 is a flow diagram illustrating the step S150 for providing the data application.

Referring to FIG. 4, the layout is configured for the scene based on the layout information included in the scene configuration information (S153).

Thereafter, the one or more components are displayed according to the layout configured in the step S153 (S156).

The one or more components may be sequentially displayed according to a received order thereof.

For instance, the first component is displayed according to the layout when the first component is received, and the second component may be then displayed according to the layout when the second component is received.

[Mode for Invention]

Figure 5:
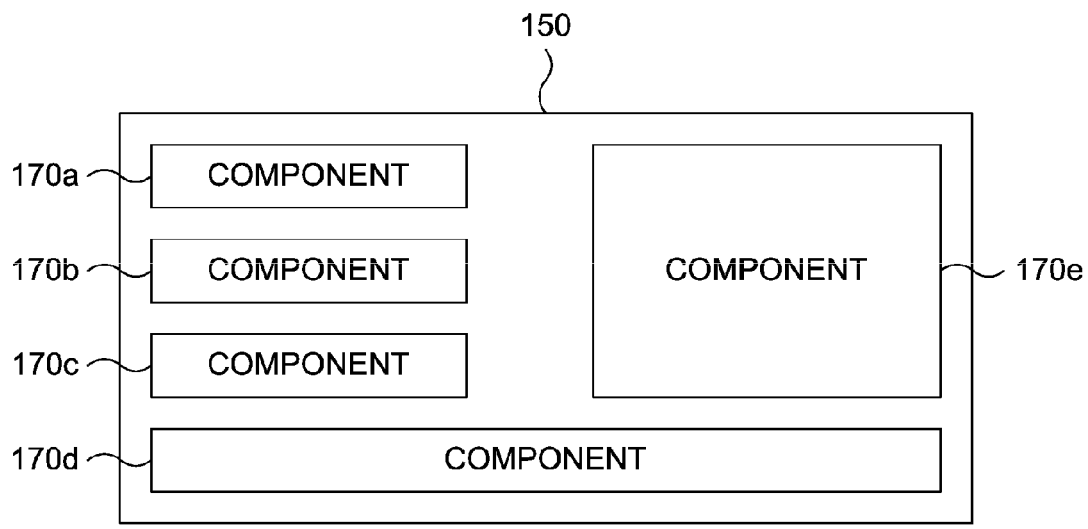
FIG. 5 is a diagram exemplifying the layout of the scene in accordance with the method of the present invention.

FIG. 5 is a diagram exemplifying the layout of the scene in accordance with the method of the present invention.

Referring to FIG. 5, the scene of the data application is displayed on a display device 150 connected to the receiver.

The scene in FIG. 5 includes components 170a through 170e.

The layout information defines an arrangement of the components 170a through 170e displayed on the display device 150.

The layout is configured based on the layout information and the components 170a through 170e are arranged according to the layout.

A detailed description of the personalized data application is described when the component 170e of FIG. 5 is an advertisement video.

The apparatus for providing the components selects one of the advertisement video based on the receiver identification information or the viewer identification information in order to provide an advertisement suitable for the viewer. The selected advertisement video is then designated as the component 170e and transmitted to the receiver.

The receiver displays the advertisement video, which is the component 170e, on the display device according to the layout. The personalized data application can be provided because the advertisement video is selected based on the receiver identification information or the viewer identification information.

In accordance with the present invention, a time necessary for receiving and executing the data application is minimized because the components of the data application is received via the communication network of high speed instead of the broadcasting network. A limit in the number of or the size of the data application is minimized because only the scene configuration information is transmitted through the broadcasting network. In addition, the personalized data application can be provided based on the receiver identification information or the viewer identification information.

While the present invention has been particularly shown and described with reference to the preferred embodiment thereof, it will be understood by those skilled in the art that various changes in form and details may be effected therein without departing from the spirit and scope of the invention as defined by the appended claims.

[Industrial Applicability]

In accordance with the present invention, a time necessary for receiving and executing the data application is minimized. A limit in the number of or the size of the data application is also minimized. In addition, the personalized data application can be provided based on the receiver identification information or the viewer identification information.

The invention claimed is:

1. A method for providing a data application of a digital broadcasting, the method comprising steps of:
    (a) receiving, in a receiving unit, a scene configuration information for a scene of the data application from a digital broadcasting network;
    (b) receiving, in the receiving unit, one or more components constituting the scene based on the scene configuration information from the digital broadcasting network; and
    (c) providing, on a viewing screen of the receiving unit, the data application based on the scene configuration information and the one or more components,
    wherein the scene configuration information comprises a download path information which points to an apparatus for providing each of the one or more components,
    wherein the scene configuration information comprises an execution code for interpreting the scene configuration information,
    wherein each of the one or more components comprises an independently executable code that is executed independently in the scene, and
    wherein the step (b) comprises:
    (b-1) transmitting a transmission request for the one or more components to the apparatus by referring to the download path information; and
    (b-2) receiving the one or more components from the apparatus,
    wherein each of the download path information for each of the one or more components differs from one another.

2. The method in accordance with claim 1, wherein the step (a) comprises receiving the scene configuration information through a digital broadcasting network.

3. The method in accordance with claim 1, wherein the step (a) comprises receiving the scene configuration information through a communication network.

4. The method in accordance with claim 1, wherein the scene configuration information defines a scene configuration based on the scene selected based on at least one of a user input, a receiving unit identification information and a viewer identification information.

5. The method in accordance with claim 1, wherein the scene configuration information comprises a text data for the scene.

6. The method in accordance with claim 1, wherein the transmission request comprises one of a receiving unit identification information and a viewer identification information.

7. The method in accordance with claim 1, wherein each of the one or more components comprises at least one of a text data, an image data, an audio data and a video data.

8. The method in accordance with claim 1, wherein the step (c) comprises:
    (c-1) configuring a layout for the scene based on the scene configuration information; and
    (c-2) displaying the one or more components according to the layout.

9. The method in accordance with claim 8, wherein the step (c-2) comprises displaying the one or more components according to a received order thereof.

10. The method in accordance with claim 1, wherein the receiver comprises a set-top box and a television, the television comprising the viewing screen.

11. The method in accordance with claim 1, wherein the receiver comprises a mobile device.

* * * * *